United States Patent

[11] 3,632,414

[72] Inventors Fred E. Arnold
 Dayton;
 Richard L. Van Deusen, Xenia, both of Ohio
[21] Appl. No. 836,934
[22] Filed June 26, 1969
[45] Patented Jan. 4, 1972
[73] Assignee The United States of America as represented by the Secretary of the Air Force

[54] METHOD OF PREPARING FILMS AND COATINGS OF HETEROCYCLIC-AROMATIC POLYMERS
 15 Claims, No Drawings
[52] U.S. Cl. ..................................................... 117/124 E,
 117/132 R, 117/161 P
[51] Int. Cl. ....................................................... B44d 1/36,
 C03c 17/06
[50] Field of Search ........................................... 117/124 E, 132, 161 P

[56] References Cited
 UNITED STATES PATENTS
 3,274,164 9/1966 Hurwitz ......................... 117/161 X
 OTHER REFERENCES
 Journal of Polymer Science, PA, Vol. 3, Pages 3,549–3,560, 1965, Dawans et al.

*Primary Examiner*—William D. Martin
*Assistant Examiner*—Bernard D. Pianalto
*Attorneys*—Harry A. Herbert, Jr. and Alvin B. Peterson ABSTRACT: This invention comprises a method of preparing films and coatings of aromatic-heterocyclic ladder polymers. These polymers are insoluble in solvents from which films might be cast by the ordinary technique of coating a surface with a solution of a polymer and allowing the solvent to evaporate therefrom. Since the only solvents known for such ladder polymers are sulfuric acid and methane sulfonic acid, it is not possible to use the ordinary technique of laying film by the solvent evaporation process because of the high boiling points and high temperatures thereby required. Furthermore, the surface to be coated may be susceptible to attack by such corrosive solvents. According to the present invention it has been found that films and coatings of the ladder polymers can be formed by using a fine dispersion of the ladder polymer in a nonsolvent, such as alcohol or an easily evaporated hydrocarbon. A relatively smooth, strong film can be prepared by collecting the particles from the dispersion either by filtration on a porous surface such as fritted glass or by drawing a metal surface through the dispersion and allowing the dispersion medium to evaporate from the wetted metal surface and thereby deposit the dispersed polymer particles thereon.

3,632,414

1

METHOD OF PREPARING FILMS AND COATINGS OF HETEROCYCLIC-AROMATIC POLYMERS

The invention described herein may be manufactured and used by or for the U.S. Government for governmental purposes without payment to us of any royalty thereon.

BACKGROUND OF THE INVENTION

Field of the Invention

The present invention relates to films and coatings of heterocyclic-aromatic ladder polymers and to the method for preparing such films and coatings.

Ladder polymers of the type described herein are very insoluble and the only solvents known are sulfuric acid for relatively low molecular weight polymers and methane sulfonic acid for high molecular weight polymers. However both of these acids are very high boiling and require high temperatures for removal by evaporation or vaporization. Therefore solutions of such polymers in these solvents are not suitable for the preparation of films by the prior art technique of laying a coating of a polymer solution on a surface and allowing the solvent to evaporate therefrom and thereby deposit a film.

While the prior art shows a number of "ladder" polymers, there is no teaching as to how these ladder polymers can be processed or formed into films or coatings after they are precipitated or converted to an insoluble state. Hereinafter the expression "film" or "films" is used generically to include coatings.

STATEMENT OF THE INVENTION

In accordance with the present invention it has now been found possible to process insoluble ladder polymers into films by forming a fine dispersion of the ladder polymer in a nonsolvent medium such as an alcohol or a hydrocarbon, and then collecting the particles from the dispersion either by filtration on a porous surface or by drawing a metal surface through such a dispersion, upon which surface the dispersed particles become "associated" to form a coating, and subsequently evaporating the nonsolvent medium from the coating. The thickness of the deposited film can be increased by repetition of the process.

Surprisingly, the film formed by both the filtration technique and by the deposition technique form relatively smooth and strong films. The application of heat, pressure and other curing techniques can also be applied to the film or coating so produced.

The process of this invention avoids the use of high temperature and vacuum that would otherwise be required to remove solvent from a film if it were to be produced by depositing a layer of solution on the surface. Moreover, this present process permits the use of room temperature in the production of a film and does not require unworkable or impractical solvents. Instead it uses very easily handled suspension media.

While various nonsolvent suspension media can be used, provided they are relatively volatile, alcohols and hydrocarbons having a boiling point preferably no higher than 100° C. are advantageously used. Higher boiling point materials may also be used, but obviously are less practical since they require a longer drying or evaporation time. Typical preferred nonsolvent suspension media include ethanol, propanol, isopropanol, methanol, butanol, pentanol, hexane, cyclohexane, heptane, octane, decane, benzene and the like.

The ladder polymers used in the practice of this invention advantageously have an intrinsic viscosity of 1.0 or more as tested in a methane sulfonic acid solution using standard methods of determination. Preferably higher molecular weight polymers are used having an intrinsic viscosity of 4–6.

The thickness of the film deposited is controllable to some extent by the concentration and volume of the dispersion used and the geometric aspects of the dispersed particles. The thickness can also be increased by repeating the deposition process.

Since neither films nor coatings have previously been reported in the literature for ladder polymers for the obvious reason that they have not been processable according to prior art techniques, the films produced according to the process of this invention are the first films produced of ladder type polymers of molecular weights represented by an intrinsic viscosity of at least 1.0. The films produced according to the process of this invention have high resistance to heat and chemicals.

Surprisingly, it has been found that the technique of the present invention, while useful in preparing films of ladder polymers, is not successful for nonladder polymers and even for some partial or semiladder polymers, e.g. those containing some single-bond links. For this reason it is believed that the orientation or association of the various ladder-type structures as they come in proximity with each other results in a film being deposited of character peculiar to ladder polymers.

The various ladder polymers that can be used in the practice of this invention include ladder polymers, e.g., U.S. Pat. Nos. 3,542,742 and 3,546,181. These include various fused ring aromatic-heterocyclic polymer systems.

Suitable for the purpose of this invention are the polymers disclosed by one of the present inventors who has published information on ladder polymers derived by the polycondensation of 1,4,5,8-naphthalenetetracarboxylic acid with 1,2,4,5-tetraaminobenzene. See Van Deusen, J. Polymer Sci., 4, 211–214 (1966).

Other ladder polymers suitable for the purpose of this invention have been synthesized from fused ring tetrafunctional monomers, such as 1,2,4,5-tetraaminobenzene; 1,4,5,8-tetraaminonaphthalene; pyromellitic tetracarboxylic acid dianhydride; 1,4,5,8-naphthalene tetracarboxylic acid; and 4,5-diamino-1,8-naphthalic acid anhydride as reported by Dawans and Marvel, J. Polymer Science, A3; 3,549 (1965); Bell and Pezdertz (same) B3, 977 (1965); Colson et al. (same), A-1, 4, 59 (1966); Arnold and Van Deusen (same), B6, 815 (1968).

Van Deusen, J. Polymer Sci., B4, 211 (1966) and Van Deusen, et al., J. Polymer Sci. (A-1), 6, 1,777 (1968) disclose a ladder polymer suitable for use in this invention. This has fused benzamidazobenzophenanthroline ring-repeating unit ring structure:

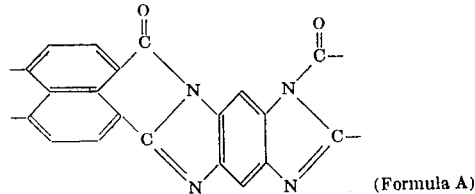

(Formula A)

Such ladder polymers are prepared by the polycondensation of tetrafunctional compounds containing naphthalene nuclei and possessing carboxy derivative functional groups located at adjacent alpha or peri positions (1,8 or 4,5 positions) of the ring, these having the structure

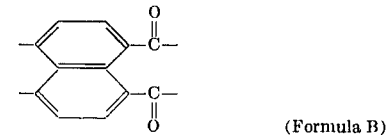

(Formula B)

With tetrafunctional compounds containing benzene or other aromatic nuclei and possessing amino functional groups located at adjacent positions, or ortho to each other, with the structure having formula C in the specific case of a benzene nucleus and having formula D where Ar represents the aromatic nucleus generically

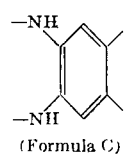

(Formula C)

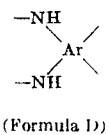

(Formula D)

to produce polymers which contain the naphthaloyl-1,2-benzimidazole fused ring structure.

In the above formulas the valencies of the aromatic nuclei which are unoccupied are attached to hydrogen or various other groups as specified below, and in the case of the naphthalene nucleus which has the two carboxy groups in the 1,8 positions, there can also be two additional carboxy groups in the 4,5 positions or there may be two amino radicals occupying adjacent positions, that is positions ortho to each other.

Moreover, the benzene nucleus of formula C can also have various other groups occupying the other positions and two of the valencies should be occupied by amino groups also ortho to each other. In addition to the benzene nucleus shown, the aromatic nucleus, Ar of formula D can also be naphthalene, diphenyl, etc., with two adjacent valencies being occupied as shown in the benzene nucleus, and also two other adjacent valencies being occupied by two other amino groups, or in the case of naphthalene, 2 peri positions (1,8 or 4,5) can be occupied by carboxy radicals as shown above.

The Ar radical shown in formula D preferably has a benzene nucleus, but it can have a naphthalene, diphenyl, diphenyloxide, diphenylamine, diphenylsulfide, diphenylketone, diphenylsulfone, diphenylsulfoxide, diphenylmethane, etc., nuclear structure and can have various substituent groups thereon such as various hydrocarbon radicals, namely alkyl, alkenyl, aryl, alkaryl, aralkyl, cycloalkyl, cycloalkenyl, including as typical examples, methyl, ethyl, propyl, butyl, hexyl, decyl, phenyl, tolyl, naphthyl, methylnapthyl, ethylnaphthyl, diphenyl, xylyl, cyclohexyl, cyclopentyl, cyclohexenyl, methylcyclohexyl, methylcyclohexenyl, vinyl, allyl, hexenyl, octenyl, ethylphenyl, vinylphenyl, allyl phenyl, etc., and also chlorophenyl, bromophenyl, fluorophenyl, iodophenyl, trifluoromethyl, etc., and also halogen atoms, such as chloro, bromo, iodo and fluoro; cyano, etc. Advantageously there are no more than 20 carbon atoms in such substituent groups, preferably no more than about ten.

When 1,4,5,8-naphthalene tetracarboxylic acid (formula E), or reactive derivative, is reacted with 1,2,4,5-tetraaminobenzene, or reactive derivative, the final product is a polymer having the repeating unit structure shown in formula A

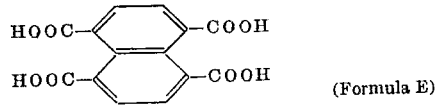

(Formula E)

It is also possible to obtain the basic fused ring structure of formula A in slightly different arrangement in the total polymer structure by condensing a naphthalene compound which has two carboxylic or reactive derivative groups in the peri position, that is either 1,8 or 4,5 and also has two amino radicals ortho or peri to each other in the same naphthalene compound.

Such compounds can be represented by the formula

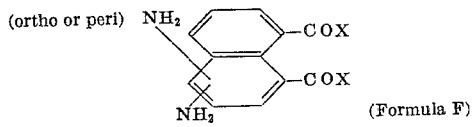

(Formula F)

In this case, the basic polymer structure can be represented by the following repeating unit structures:

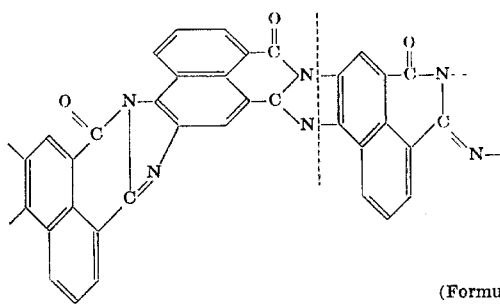

(Formula G)

or

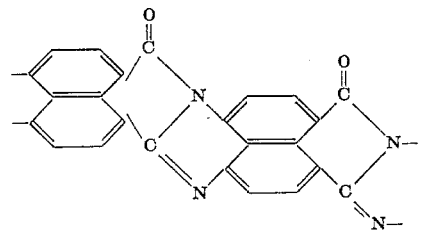

(Formula H)

In the above formula G the portion between the dotted lines corresponds to the structure above in formula A. In the formula A, when naphthalene, diphenyl, diphenyloxide, etc., are used as the nucleus for the four amino groups, the repeating unit structure of formula A will vary accordingly. Thus, when 1,4,5,8-tetracarboxy naphthalene is used as the starting material, that is one having formula E shown above, for condensation with 1,2,4,5-tetraaminobenzene, the structure of the resultant condensation polymer is above in formula A. Corresponding structures are obtained when the tetraamino compound is naphthalene or diphenyl compound in which case the benzene, naphthalene and diphenyl nucleus can be represented as Ar, in which case the amino groups are arranged in two pairs, each member of a pair being ortho to the other member of the pair, and the other positions of the aromatic nucleus being occupied by hydrogen or one of the monovalent radicals specified herein. These are represented below by formula J.

When a mixture is used of compounds of formula E and of the tetraamino compounds represented by

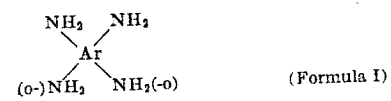

(Formula I)

the fully condensed product can be represented by the formula wherein the respective N's are paired in adjacent positions

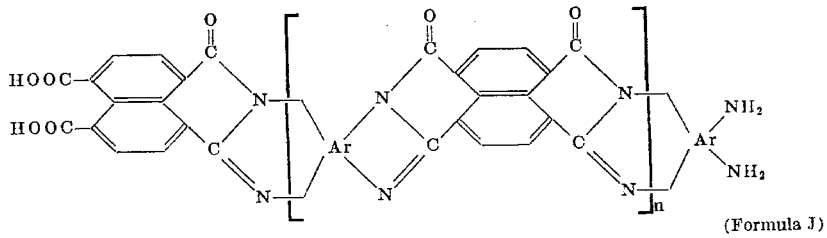

(Formula J)

on the Ar nucleus, and $n$ has a value of at least 2, preferably at least 4.

The inversion of the two cyclic rings is considered equivalent, for example

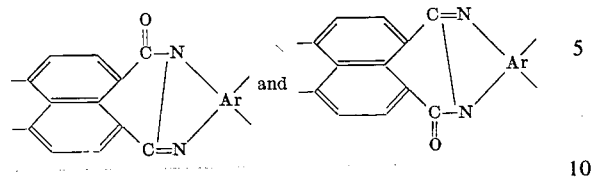

are considered equivalent.

When a condensing monomer of formula F is used the resulting polymer can be represented by the following formula in which the two amine groups are positioned ortho or peri to each other.

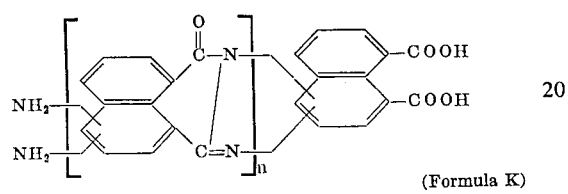

(Formula K)

The ladder structures, for present purpose, will be referred to as those possessing fused 5-6, 6-5, 5—5 and 6—6 ring systems, the numerical ring designations originating from the respective anhydride and diamine reaction sites of the monomers. These are represented below in formulas II, II and IV–IVc respectively.

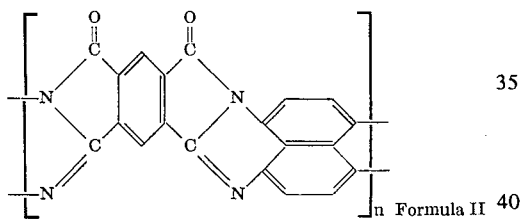

Formula II

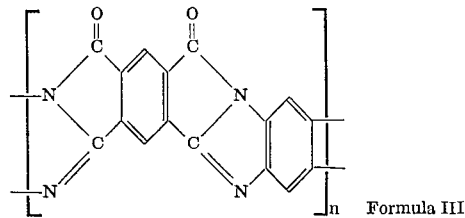

Formula III

In another application filed by the present coinventors, Ser. No. 718,375, filed Apr. 3, 1968 and now issued as U.S. Pat. No. 3,452,742, a number of ladder polymers are disclosed and claimed having 6—6 fused ring systems as illustrated below by formulas IV through IVc;

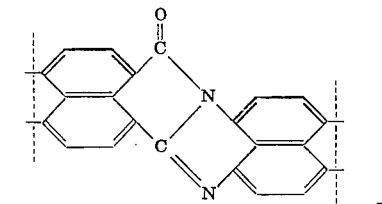

Formula IV

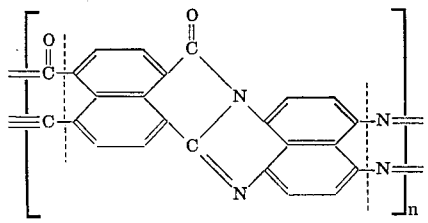

Formula IVa

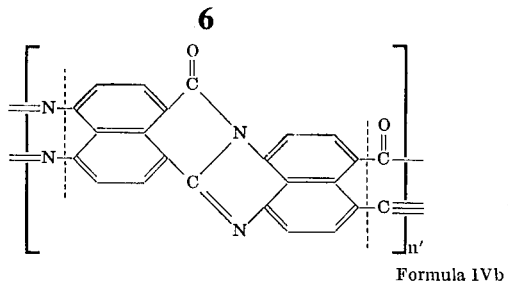

Formula IVb

This same polymer can be represented by formula IVc. In these formulas, n' is an integer having a value of at least one, preferably at least 2, and n is at least 2, preferably at least 4.

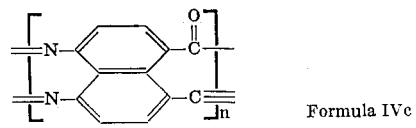

Formula IVc

When the condensation polymer is derived from the reaction of 1,4,5,8-naphthalenetetracarboxylic acid or a derivative thereof, with 1,4,5,8-tetraaminonaphthalene, the repeating unit has the structure shown above in formula IIVa. In this structure it will be noted that the structure of formula IV is contained between the two doted vertical lines imposed on formula IVa. It will be noted that in each of the formulas IV through IVc the two naphthalene nuclei are joined by two fused rings of six members each.

When these polymers are prepared by the self-condensation of 4,5-diamino-1,8-naphthalenedicarboxylic acid, the repeating unit is that shown in formula IVb. Here again, the structure of formula IV is shown between the two dotted vertical lines superimposed on formula IVb. Likewise the two naphthalene nuclei are joined together by two fused rings of six members each.

In formula IVb and in formula IVc the two fused rings are repeated in identical arrangement in each repeating unit. In the polymer of formula IVa, the configuration of the two fused rings is identical in alternate positions with the intermediate configurations being mirror images of those in the alternative positions.

In the above formulas IV–Ivc, the valencies of the aromatic nuclei which are shown unoccupied are attached to hydrogen or can have various other groups substituted thereon, such as R, defined below, and also chlorophenyl, bromophenyl, fluorophenyl, iodophenyl, trifluoromethyl, etc.; and also halogen atoms such as chloro, bromo, iodo, and fluoro; cyano, etc. Advantageously there are no more than 20 carbon atoms in such substituent groups, preferably no more than 10, particularly in the R groups.

R is a hydrocarbon radical, namely alkyl, alkenyl, aryl, alkaryl, aralkyl, cycloalkyl, cycloalkenyl, including as typical examples methyl, ethyl, propyl, butyl, hexyl, decyl, phenyl, tolyl, naphthyl, methylnaphthyl, ethylnaphthyl, diphenyl, xylyl, cyclohexyl, cyclopentyl, cyclohexenyl, methylcyclohexyl, methylcyclohexenyl, vinyl, allyl, hexenyl, octenyl, ethylphenyl, vinylphenyl, allylphenyl, etc.

Another ladder polymer suitable for the practice of this invention is disclosed in the F. E. Arnold application, Ser. No. 816,839 filed Apr. 16, 1969, and now issued as U.S. Pat. No. 3,546,181. This polymer (formula X) is prepared by the condensation of a tetracarboxylic acid with a new tetraamino fused ring compound which in turn is prepared by the condensation of the 1,2-ditosylate of 1,2,4,5-tetraaminobenzene (formula VI) with 1,2,6,7,-tetraketopyrene (formula VII). The ditosylate of the tetraaminobenzene is prepared by the hydrogenation of 1,2-dinitro-4,5-(p-toluenesulfamido) benzene (formula V) by chemical reduction with sodium hydrosulfite. The preparation, starting with the preparation of the ditosylated tetraaminobenzene is shown in the following reactions:

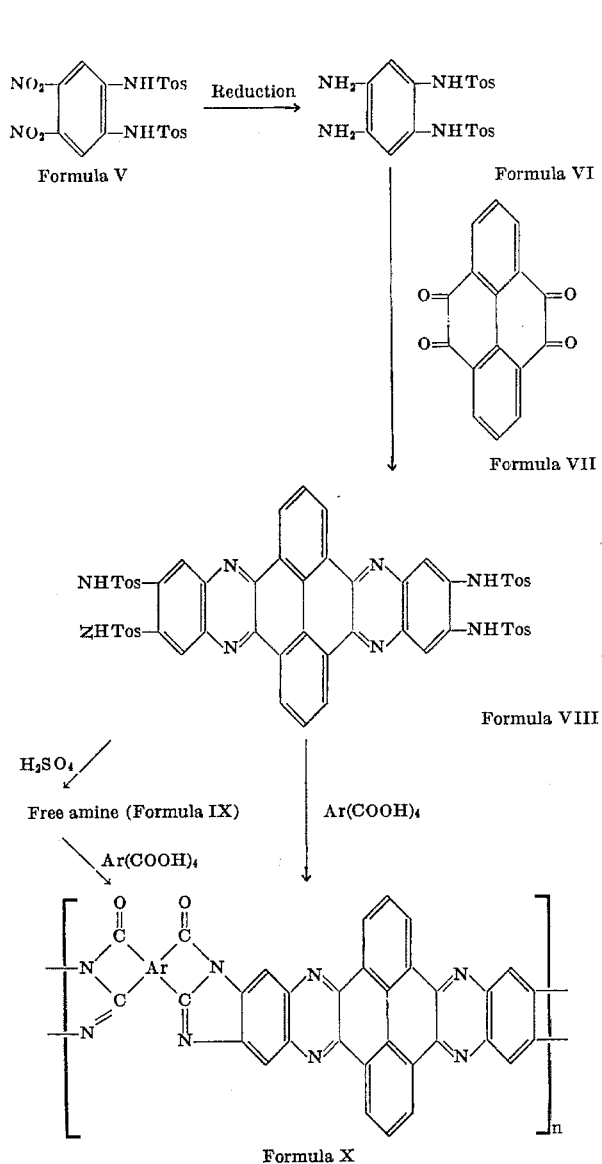

When Ar represents 1,4,5,8-naphthalene tetracarboxylic acid, formula X is

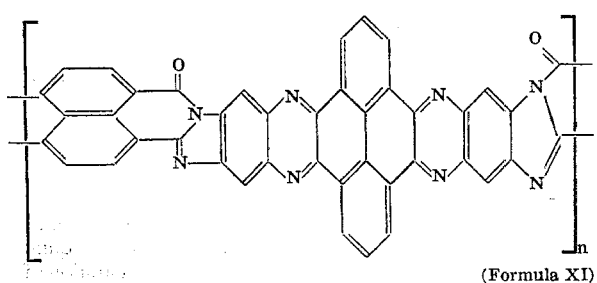

(Formula XI)

When Ar represents 1,2,4,5-benzene tetracarboxylic acid, formula X is

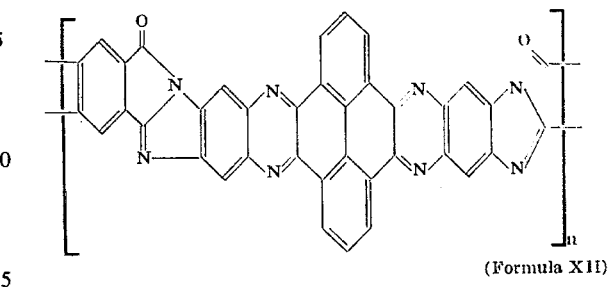

(Formula XII)

The tetraamino compound, either in the free amine form (formula IX) or in the tosylated salt form (formula VIII) is reacted with various tetracarboxylic acids or their reactive derivatives to form ladder polymers. The polymerization condensation is effected in polyphosphoric acid under conditions described above for preparing other ladder polymers.

The following procedures can be used in preparing the various intermediates:

Preparation of 1,2-Diamino-4,5-(p-toluenesulfamido)benzene

To a solution of 15.2 g. (30.0 mmoles) of 1,2-dinitro-4,5-(p-toluenesulfamido)benzene in 150 ml. of dimethylacetamide at 90° C. there is added dropwise, under nitrogen, an aqueous solution 31.3 g. (180.0 mmoles) of sodium hydrosulfite. After the addition is complete, the temperature is maintained at 90° C. for 2 hours. The cooled reaction mixture is added to 500 ml. of deoxygenated water to precipitate a white solid. The material is collected, washed with water, and recrystallized from methanol to afford 8.5 g. (63 percent) of the product, mp. 238°–239° C.

Preparation of 2,3,11,12-Tetra(p-toluenesulfamide)-diquinoxal (2,3-e2',3'-1)pyrene To a solution of 8.93 g. (20.0 mmoles) of 1,2-diamino-4,5-(p-toluenesulfamido)benzene in 250 ml. of glacial acetic acid there is added 2.62 g. (10.0 mmoles) of 1,2,6,7-tetraketopyrene. The solution is stirred at 60° C. under a nitrogen atmosphere, for 8 hours. The yellow precipitate is collected, washed with water, and recrystallized from dimethylacetamide to afford 8.90 g. (82 percent) of the product, mp. 300° C.

Preparation of 2,3,11,12-Tetraamino-diquinoxal(2,3-e,2',3'-1)pyrene:

To 150 ml. of concentrated sulfuric acid there is added 10.8 g. (10.0 mmoles) of 2,3,11,12-tetra(p-toluenesulfamido)diquinoxal(,3-e.2',3'-1)pyrene. The solution is stirred at room temperature for 6 hours, cooled to ° C. and poured over ice to precipitate a dark red solid. The red material is collected, washed with water, and added to a deoxygenated 20 percent ammonium carbonate solution to give a light yellow solid. The free amine is collected, washed with deoxygenated water, dried under reduced pressure, and recrystallized from dimethylacetamide to afford 4.43 g. (95 percent), mp. 300° C.

Preparation of Polymer from 1,4,5,8-Naphthalenetetracarboxylic acid

To 50 g. of deoxygenated polyphosphoric acid there is added, under a nitrogen atmosphere, 0.1543 g. (0.453 mmoles) of 1,4,5,8-naphthalenetetracarboxylic acid and 0.2117 g. (0.453 mmoles) of 2,3,11,12-tetramino-diquinoxal(2,3-e,2',3'-1pyrene. The mixture is heated at the rate of 3° C./minute to 180° C. and maintained at that temperature for 10 hours. The solution is then allowed to cool to 30° C. and the polymer is precipitated into 500 ml. methane sulfonic acid and reprecipitated into anhydrous methanol. The product, 0.29 g. (99 percent), has an inherent viscosity of 0.36 dl./bm. in methane sulfonic acid (0.3 g./100 ml. at 30° C.).

Preparation of

Various Related Polymers

The preceding procedure is repeated a number of times using individually, in place of the naphthalenetetracarboxylic acid, equivalent weights respectively of;
a. 1,2,4,5-Benzene tetracarboxylic acid;
b. 1,2,5,6-Naphthalene tetracarboxylic acid;
c. 1,2,6,7-Pyrene tetracarboxylic acid; and
d. 0,0,0',0'-Diphenyl tetracarboxylic acid.
In each case ladder polymers are obtained.

The other aromatic-heterocylic ladder polymers suitable for use in the practice of this invention can be prepared by the methods described in the prior art, such as the references cited hereinabove. These involve the condensation reaction of a tetrafunctional compound either with itself, as in the case of a diamino dicarboxylic acid compound, or with another tetrafunctional compound as in the case of a tetracarbocylic acid and a tetraamino compound.

A preferred method for synthesizing the polymers involves the heating of the tetrafunctional compound or mixtures of tetrafunctional compounds in polyphosphoric acid. The reactants and solvent are preferably mixed at temperatures of up to 50° to 70° C. to attain reasonable homogeneity and free stirring before the mixture is raised to reaction temperatures of approximately 100° to 220° C. The reaction products are then preferably precipitated from the polyphosphoric acid reaction solution with water or other polymer nonsolvents, after which the products may be extracted with N,N-dimethylaceamide and/or reprecipitated from concentrated sulfuric acid or other polymer solvent. The carboxylic acid groups can be in the form of the free acid, the acid chloride, the acid anhydride or other reactive derivative forms. The amino group can be in the form of the free amine, the hydrochloride or other reactive salt derivative. If the amine hydrochloride is used, the preliminary heating at 50°-70° C. is continued until the evolution of hydrogen chloride subsides. The polymers are soluble in benzene sulfonic acid, methane sulfonic acid and polyphosphoric acid.

By the above procedure, the following typical ladder polymers are prepared:
a. 1,4,5,8-Naphthalene tetracarboxylic acid reacted with 1,2,4,5-tetraaminobenzene gives a polymer having repeating units of formula A.
b. 3,4Diamino-1,8-naphthalene dicarboxylic acid reacted with itself gives a polymer having repeating units of formula H.
c. 1,4,5,8-Naphthalene tetracarboxylic acid reacted with aromatic tetraamines having the amine groups paired with the members in each pair positioned ortho or peri to each other gives polymers having repeating unit structures of formula J. In addition to the tetraaminobenzene in paragraph (a) above, another suitable tetraamine is 1,4,5,8-tetraaminonaphthalene.
d. The polymer produced by the self-condensation of 3,4-diamino-1,8-naphthalene dicarboxylic acid can also be represented as having repeating units of formula K.
e. 1,2,4,5-Benzene tetracarboxylic acid reacted with 1,4,5,8-tetraaminonaphthalene gives a polymer having repeating unit structure shown in formula II.
f. 1,2,4,5-Benzene tetracarboxylic acid reacted with 1,3,4,5-tetraaminobenzene gives the polymer having the repeating unit structure shown in formula III.
g. 1,4,5,8-Naphthalene tetracarboxylic acid reacted with 1,4,5,8-tetraaminonaphthalene gives a polymer having the repeating unit structure shown in formula IVa.
h. 1,8-Diamino-4,5-naphthalene dicarboxylic acid condensed with itself gives a polymer having the repeating unit structure shown in formula IVc.

In these preparations, the corresponding dianhydride, acid chloride, tetramethyl ester, tetrabutyl ester, tetraphenyl ester and tetrabenzyl ester can be used in place of the tetracarboxylic acid.

The 4,5-diaminonaphthalene-1,8-dicarboxylic acid used above can be prepared by the reduction of 4,5-dinitronaphthalene-1,8-dicarboxylic acid or its anhydride. In addition to polyphosphoric acid, which is preferred, diglyme can be used as the reaction solvent, particularly when the dicarboxylic acid reagent is in the anhydride form.

Other ladder polymers suitable for the practice of this invention include the following which are shown in the prior art:

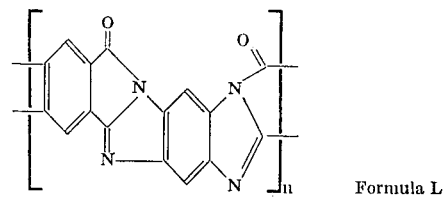

Formula L

Dawans, F. and C. S. Marvel, J. Polymer Sci., A3, 3,549 (1965); Colson, J. G., R. H. Michel and R. M. Paufler, J. Polymer Sci., (A-1), 4, 59 (1966); and Bell, V. L. and R. A. Jewell, J. Polymer Sci., (A-1), 5, 3.043 (1967).

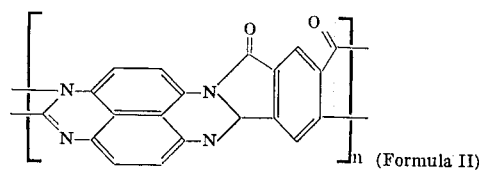

(Formula II)

Dawans, F. and C. S. Marvel, J. Polymer Sci., A3, 3,549 (1965).

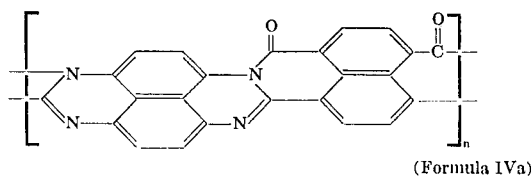

(Formula IVa)

Arnold, F. E. and R. L. Van Deusen, J. Polymer Sci., B-1, 6, 815 (1968).

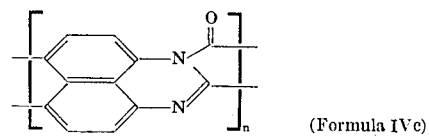

(Formula IVc)

Arnold, F. E. and R. L. Van Deusen, J. Polymer Sci., B-1, 6, 815 (1968).

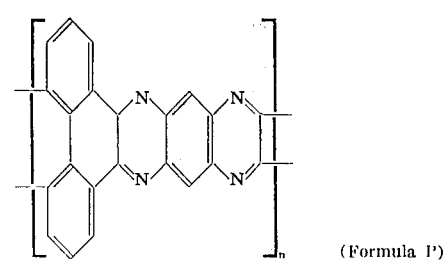

(Formula P)

Stille, J. K. and E. L. Mainen, J. Polymer Sci., B-1, 4, 665 (1966); and Stille, J. K. and E. L. Mainen, Macromolecules, 1, 36 (1968).

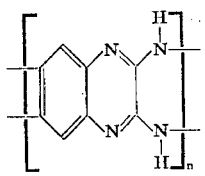
(Formula Q)

De Schryver, Frans and C. S. Marvel, J. Polymer Sci., Al, 5, 545 (1967).

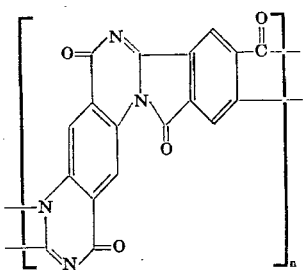
(Formula R)

Rabilloud, Par G., B. Sillon and G. De Gaudmaris, Die Makromol. Chem., 108, 18 (1967).

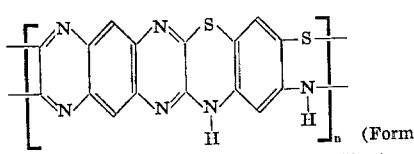
(Formula S)

Okada, Masahiko and C. S. Marvel, J. Polymer Sci., A-1, 6, 1259 (1968).

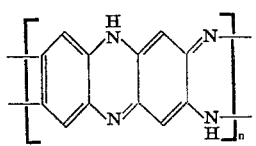
(Formula T)

Stille, J. K. and E. L. Mainen, J. Polymer Sci., B-1, 4, 39 (1966); and Stille, J. K. and E. L. Mainen, Macromolecules, 1, 36 (1968).

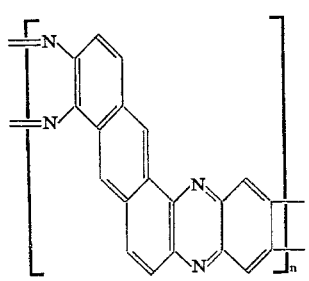
(Formula U)

Stille, J. K. and E. L. Mainen, Macromolecules, 1, 36 (1968).

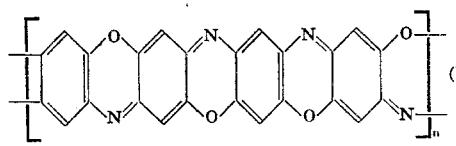
(Formula W)

Stille, J. K. and M. E. Freeburger, J. Polymer Sci., A-1, 6, 161 (1968).

SPECIFIC EMBODIMENTS OF THE INVENTION

The invention is illustrated by the following examples. These examples are presented merely for purpose of illustration and are not intended to limit the scope of the invention nor the manner in which it may be practiced. Parts and percentages in these examples and throughout the specification are given by weight.

EXAMPLE I

Preparation of Polymer Dispersion

To 400 ml. of 100 percent methanesulfonic acid is added 1 g. of a polymer having repeating units of formula A and having an intrinsic viscosity of 4.5. The resulting solution is then slowly added to 1,200 ml. of methanol to precipitate the polymer in finely divided particles (1–150 microns). The material is collected by filtering through a medium porosity fritt and washing with excess methanol until acid free. Care is taken to keep the material wet with methanol at all times during filtering and washing treatments. The finely divided particles are washed into a container and stored at concentrations of 0.1–5 percent solids.

EXAMPLE Ia

Film Formation

A dispersion containing 0.13 g. of the polymer particles prepared in example I in 100 ml. of methanol (0.13 percent solids) is filtered through a medium porosity fritt, 3,25 inches in diameter. The filtered material on drying forms a tough durable film having the following properties:
1 ml. thickness
0.94 g./cm.$^3$ density
9,600 lb./in.$^2$ tensile strength
2.8 percent Elongation at rupture
530,000 lb./in.$^2$ Initial Modulus

Example Ib

Metal Coating

A piece of titanium alloy (Ti—8AL—IV—1Mo) 1-inch square is placed in a 5 percent polymer dispersion prepared as in example I. The metal, on removal, is covered with the dark blue dispersion. The dispersion solvent is then removed by room temperature evaporation or by placing the metal substrate in a forced air oven. After removal of the solvent, a gold color-coating results, which adheres tenaciously to the metal surface. The process can be repeated to increase coating thickness.

EXAMPLE II

The procedure of example Ib is repeated with similar results except that different metals are used individually as follows:
Mild steel
Stainless steel
Aluminum
Copper
Silver

EXAMPLE III

The procedures of examples I, Ia, Ib and II are repeated with similar results using a polymer having the repeating unit structure shown above in formula J, in which Ar represents the 1,4,5,8-tetravalent naphthalene radical, and having an intrinsic viscosity of 5. Similar results are likewise produced when the corresponding polymer is used in which Ar represents 1,2,4,5-benzene.

EXAMPLE IV

To procedures of examples I, Ia, Ib and II are repeated using in place of the polymer of those examples a polymer having the repeating unit structure shown in formula A and having an intrinsic viscosity of 6. Films of good properties are produced accordingly.

EXAMPLE V

The procedures of examples I, Ia, Ib and II are repeated with excellent results using particles of a polymer having the repeating unit structure shown above in formula II and an intrinsic viscosity of 4. Similar results are also obtained when the polymer particles are those of a polymer having repeating unit structure of formula III and an intrinsic viscosity of 5.7.

EXAMPLE VI

Films of very good properties are also obtained by the procedures of examples I, Ia, Ib and II when the polymers used are individually those having repeating unit structures of formulas IVa and IVb respectively and intrinsic viscosities of 4.8 and 5.3 respectively.

EXAMPLE VII

Films of very good properties are also obtained by the procedures of examples I, Ia, Ib and II using individually polymers having the following repeating unit formulas respectively, the intrinsic viscosity in each case being in the range of 4 to 6: formulas H, XI, XII, L, P, W, R, S, T, U and W.

EXAMPLE VII

The procedures of examples I, Ia, Ib and II are repeated a number of times with similar results using in place of the alcohol suspension medium the following respectively:
  a. Ethanol
  b. Isopropanol
  c. Hexane
  d. Benzene
  e. Cyclohexane As illustrated in the above examples, the polymer particles advantageously have particles sizes in the range of 1 to 150 microns and are used in suspensions having at least 0.1 grams of polymer per 100 ml. of suspension medium, preferably 0.1–5 grams of polymer per 100 ml. of suspension medium.

The heat resistant films of this invention are useful for various purposes such as coating materials especially where heat resistant coatings are desirable, such as in aerospace flight or other places where materials are to be protected against exposure to heat.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of preparing a film of a heterocyclic-aromatic fused ring ladder polymer having five or six atoms in said fused ring which comprises the steps of:
   1. mixing a solution of said polymer in a solvent therefor with a nonsolvent for said polymer, said nonsolvent having a boiling point of no more than 100° C. at atmospheric pressure, thereby precipitating said polymer as finely divided particles having a particle size in the range of 1 to 150 microns;
   2. separating polymer particles from the resulting mixture while maintaining the particles wetted with said nonsolvent;
   3. mixing said wetted polymer particles with said nonsolvent so as to provide a suspension consisting of at least 0.1 gram of said polymer particles per 100 ml. of said nonsolvent;
   4. depositing from said suspension a layer of said polymer particles on a surface; and
   5. evaporating nonsolvent occluded to said polymer particles.

2. The process of claim 1 in which said layer is deposited by filtering the suspension through a fritted glass filter, thereby to deposit a layer of said particles on the surface of said fritted filter.

3. The process of claim 1 in which said layer is deposited on a metal surface by placing said metal surface in said suspension.

4. The process of claim 1 in which said particles are of a polymer having repeating units of the formula:

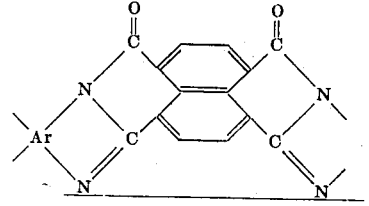

wherein Ar is an aromatic nucleus selected from the class consisting of benzene and naphthalene, and each pair of N's shown in the formula is positioned ortho or peri to the other member of the pair on the aromatic nucleus to which both members of the pair are attached.

5. The process of claim 1 in which said particles are of a polymer having repeating units of the formula:

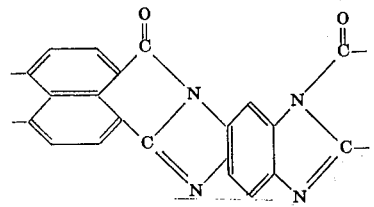

6. The process of claim 1 in which said particles are of a polymer having repeating units of the formula:

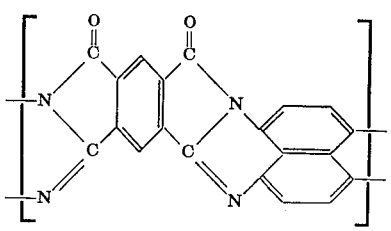

7. The process of claim 1 in which said particles are of a polymer having repeating units of the formula:

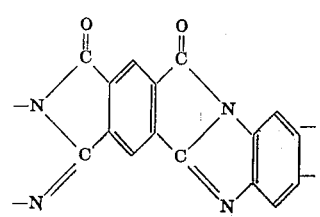

8. The process of claim 1 in which said particles are of a polymer having repeating units of the formula:

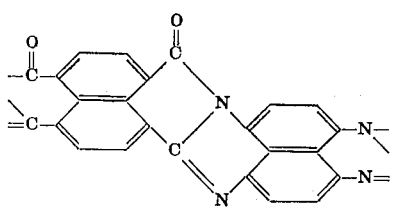

9. The process of claim 1 in which said particles are of a polymer having repeating units of the formula:

15

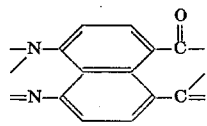

10. The process of claim 1 in which said particles are of a polymer having repeating units of the formula:

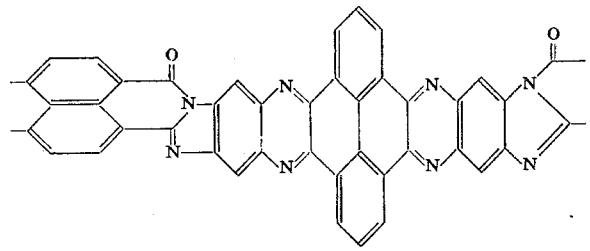

11. The process of claim 1 in which said particles are of a polymer having repeating units of the formula:

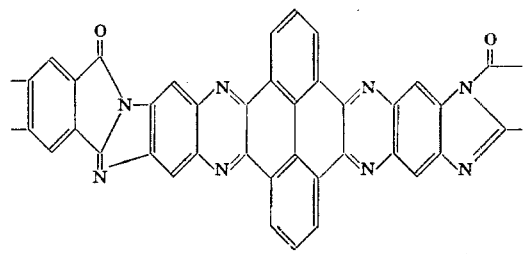

16

12. The process of claim 1 in which said particles are of a polymer having repeating units of thr formula:

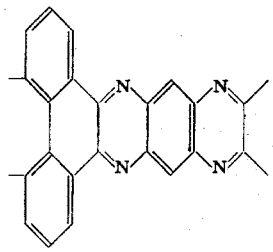

13. The process of claim 1 in which said particles are of a polymer having repeating units of the formula:

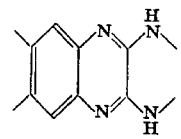

14. The process of claim 1 in which said particles are of a polymer having repeating units of the formula:

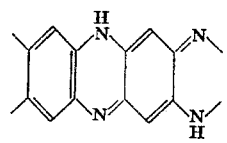

15. The process of claim 1 in which said polymer particles are separated from the resulting mixture by filtration and said separated particles are washed with nonsolvent so as to remove solvent from the particles and maintain the particles wetted with said nonsolvent.

* * * * *